S. T. BUCHANAN & H. T. PORTER.
ANTISLIP DEVICE FOR WHEELS.
APPLICATION FILED JUNE 1, 1917.
1,283,396.
Patented Oct. 29, 1918.
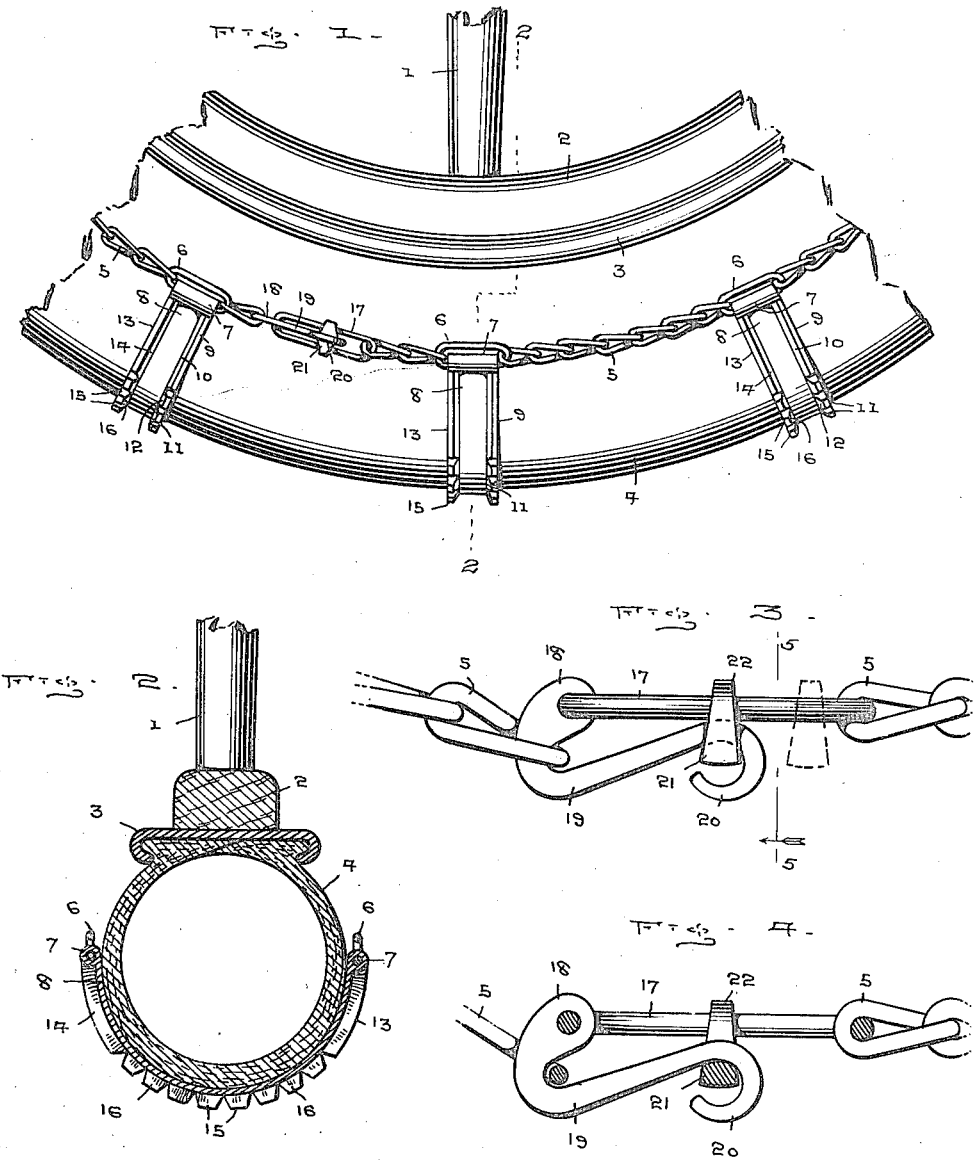

UNITED STATES PATENT OFFICE.

SAMUEL T. BUCHANAN AND HARRISON T. PORTER, OF ABERDEEN, SOUTH DAKOTA, ASSIGNORS TO A. K. S. MANUFACTURING COMPANY, OF ABERDEEN, SOUTH DAKOTA, A CORPORATION OF SOUTH DAKOTA.

ANTISLIP DEVICE FOR WHEELS.

1,283,396. Specification of Letters Patent. Patented Oct. 29, 1918.

Application filed June 1, 1917. Serial No. 172,275.

*To all whom it may concern:*

Be it known that we, SAMUEL T. BUCHANAN and HARRISON T. PORTER, citizens of the United States, residing at Aberdeen, in the county of Brown and State of South Dakota, have invented certain new and useful Improvements in Antislip Devices for Wheels, and do hereby declare the following to be a full, clear, and exact description of the invention, such as will enable others skilled in the art to which it appertains to make and use the same.

This invention relates to a new and improved antislip device for wheels, and is more particularly designed for use upon the pneumatic tires of automobile wheels and the like.

One of the objects of this invention is to provide a device of this character which can be attached to or detached from the wheel tire in a speedy and ready manner, and which will effectually prevent the wheel from slipping in its circumferential direction and skidding in lateral directions when in operative position upon the wheel tire.

Another object is to provide the device with claws for penetrating the surfaces over which the wheel travels and disposed at such an angle that the greater the force in the direction of the tendency of the wheel to slip or skid the deeper the claws will penetrate the surfaces.

Another object is to provide the device with securing members for detachably securing the device upon a wheel tire and which securing members when once fastened cannot become unfastened by vibrations, shocks, and the like, but require manual operation to effect this result.

Another object is to provide a device of this character consisting of few parts, simple in construction and application, efficient and durable, and which can be manufactured and sold upon the market at a nominal cost.

These and other objects and advantages will more fully appear as the nature of the invention is more clearly understood from the following description taken in connection with the accompanying drawings wherein a preferred embodiment of the invention is disclosed, but which is susceptible to numerous variations and modifications in the form, construction, and arrangement of the parts thereof to meet the exigencies of the case without departing from the spirit of the invention or exceeding the scope of the appended claim.

In the drawings:

Figure 1 is a fragmentary side view of the lower portion of a wheel, showing the invention in applied operative position upon the wheel tire.

Fig. 2 is a vertical transverse sectional view on line 2—2 of Fig. 1.

Fig. 3 is a top plan view of one of the securing members.

Fig. 4 is a horizontal longitudinal sectional view of the device shown in Fig. 3.

Fig. 5 is a horizontal transverse sectional view of the device shown in Fig. 3, taken on line 5—5 and looking in the direction of the arrow.

Referring to the drawings, wherein similar reference characters denote corresponding parts throughout the several views, 1 denotes the spokes of the wheel, 2 the felly, 3 the rim, and 4 the pneumatic tire secured in the rim 3 in the usual manner.

Adapted to be positioned and secured at the sides of the tire 4 are the chains 5 extended around the tire 4 in its circumferential direction in parallel relation to each other at diametrically opposite points and preferably about half way between the rim 3 and the center line of the tread of the tire 4, and formed in each of the chains 5 are the plurality of equispaced elongated links 6, the links 6 of the chains 5 being arranged so that the links 6 of the chains 5 will provide oppositely disposed pairs of links.

Suitably secured to certain of the bars of the pairs of links 6, preferably the outermost of the bars, are the apertured ears 7 of the bars 8. These bars 8 are formed of a substantial width and curved in their longitudinal direction to substantially the form of a half circle and connect together the respective pairs of the links 6 and are adapted to snugly engage and embrace the tread surface of the tire 4 and in a transverse direction with respect to the tire 4.

Upon one edge of each of the bars 8 are the flanges 9 formed with the inner beveled face 10 and projecting outwardly in right angular relation to the bars 8, and formed upon the central portions of the flanges 9 are the plurality of teeth or claws 11 provided with the inner beveled faces 12. Upon the opposite side edges of the bars 8 are the flanges 13 also provided with the inner beveled faces 14 and likewise have formed upon their central portions the teeth or claws 15 also provided with the inner beveled faces 16. These claws 11 and 15 are provided for penetrating the surfaces over which the wheel travels and by beveling the inner faces of the flanges 9 and 13 and their teeth or claws 11 and 15 there is provided a substantial knife-like edge upon the flanges and the teeth or claws at their outer side edges so that the respective claws 11 and 15 of the bars 8 are deflected in opposite directions to each other so that the claws will efficiently penetrate the surface in either direction whether the wheel is being operated by traction power or has had the brake applied thereto. For example, if the wheel is being driven to travel toward the left the claws 11 of the bars 8, owing to their specific construction will efficiently force their way into the surface, or should the vehicle be traveling down hill and the brake applied to the wheel the claws 15 will then efficiently penetrate the ground for retarding the speed of the vehicle.

In order to secure the chains 5 upon the sides of the tire 4 with the bars 8 embracing and engaging the transverse surfaces of the tire 4, the chains 5 are each provided in one of their ends with the elongated link 17 having pivotally mounted in its free end the apertured curved end 18 of the substantially S-shaped securing member 19, the securing member 19 being provided at its opposite end with the substantially circular hook end 20 adapted to be hooked upon the substantially U-shaped retaining bar 21 which has its apertured ears 22 slidably mounted upon the parallel bars of the link 17. When attaching the chains 5 and the bars 8 upon the tire 4, the same are passed around the periphery of the tire 4 and the securing members 21 are passed through a link in the adjacent ends of the chains 5 and swung around until the link is hooked within the curved end 18 of the member 21. The hook ends 20 of the member 21 are passed sufficiently through the links 17 to permit the retaining bar 21 to be passed along the bars of the links 17 so as to be engaged within the hook ends 20 of the members 21, as clearly illustrated in Figs. 3 and 4 of the drawings and owing to the specific construction of the hook ends 20 of the securing members 21 and the specific construction of the co-acting retaining bars 21 it would be impossible for the hook ends 20 to become unfastened or disengaged from the retaining bars 21 by vibrations, shocks, and the like and they can only be unfastened or released from their engagement with each other by manual operation.

Having described our invention, what we claim as new and desire to secure by Letters Patent, is:—

Means for securing a chain having separable ends, comprising a link member upon one end of said chain having straight parallel side bars, a securing hook pivotally mounted upon one end of said link and adapted to engage a link at the opposite ends of said chain, and a U-shaped retaining bar adapted to engage the free end of said securing hook and having opposite apertured ends slidably mounted upon the side bars of said link.

In testimony whereof we have signed our names to this specification in the presence of two subscribing witnesses.

SAMUEL T. BUCHANAN.
HARRISON T. PORTER.

Witnesses:
C. A. WILSON,
ROSWELL BOTTUM.